United States Patent
Shang et al.

(10) Patent No.: US 11,199,981 B2
(45) Date of Patent: Dec. 14, 2021

(54) METHOD AND SYSTEM FOR BINDING STORAGE DEVICE AND HOST, AND METHOD AND SYSTEM FOR VERIFYING STORAGE DEVICE AND HOST

(71) Applicant: SHENZHEN DAPU MICROELECTRONICS CO., LTD., Shenzhen (CN)

(72) Inventors: Ning Shang, Shenzhen (CN); Yafei Yang, Shenzhen (CN)

(73) Assignee: SHENZHEN DAPU MICROELECTRONICS CO., LTD., Shenzhen (CN)

( * ) Notice: Subject to any disclaimer, the term of this patent is extended or adjusted under 35 U.S.C. 154(b) by 75 days.

(21) Appl. No.: 16/669,519

(22) Filed: Oct. 31, 2019

(65) Prior Publication Data

US 2020/0065014 A1  Feb. 27, 2020

Related U.S. Application Data

(63) Continuation of application No. PCT/CN2018/094547, filed on Jul. 4, 2018.

(30) Foreign Application Priority Data

Jul. 11, 2017  (CN) .......................... 201710562739.5

(51) Int. Cl.
*G06F 3/06* (2006.01)
(52) U.S. Cl.
CPC .......... *G06F 3/0632* (2013.01); *G06F 3/0604* (2013.01); *G06F 3/0673* (2013.01)
(58) Field of Classification Search
None
See application file for complete search history.

(56) References Cited

U.S. PATENT DOCUMENTS

| 8,949,526 B1* | 2/2015 | Elayouty | G06F 3/067 711/114 |
| 2015/0089223 A1* | 3/2015 | Tasher | G06F 21/85 713/168 |

(Continued)

FOREIGN PATENT DOCUMENTS

| CN | 101588245 A | 11/2009 |
| CN | 104765570 A | 7/2015 |

(Continued)

OTHER PUBLICATIONS

Kaaniche, Nesrine. 'A Novel Zero-Knowledge Scheme for Proof of Data Possession in Cloud Storage Applications', [online] IEEE Xplore, Jul. 8, 2014, pp. 522-531. [retrieved on Mar. 3, 2021], Retrieved from: IEEE Xplore. INSPEC Accession No. 14431545 (Year: 2014).*

(Continued)

*Primary Examiner* — Sanjiv Shah
*Assistant Examiner* — Alexander J Yoon
(74) *Attorney, Agent, or Firm* — Bayes PLLC

(57) ABSTRACT

A method and system for binding and verifying between a storage device and hosts are provided. The method includes: sharing system parameters in advance with the hosts by the storage device, where the hosts are to be bound to the storage device; using a programmable read-only memory as the storage device, dividing the programmable read-only memory into m regions, completing the binding between each region and one corresponding host to be bound using the pre-shared system parameters, where m is a positive integer; verifying an identity of a bound host in accordance with the pre-shared system parameters through a zero-knowledge proof method by the storage device; if the verification is successful, starting the storage device and serving the bound host; if the verification is unsuccessful, (Continued)

terminating the starting of the storage device and refusing to serve the bound host.

12 Claims, 4 Drawing Sheets

(56) References Cited

U.S. PATENT DOCUMENTS

2016/0239904 A1\* 8/2016 Washington ....... G06Q 30/0635
2017/0010962 A1 1/2017 Yang et al.

FOREIGN PATENT DOCUMENTS

| | | |
|---|---|---|
| CN | 105024823 A | 11/2015 |
| CN | 205862287 U | 1/2017 |
| CN | 107392063 A | 11/2017 |

OTHER PUBLICATIONS

"Lagrange polynomial" [online], Wikipedia, Apr. 14, 2017 [retrieved Mar. 4, 2021], Retrieved from the internet: https://en.wikipedia.org/wiki/Lagrange_polynomial (Year: 2017).\*
Office action issued in corresponding Chinese Application No. 201710562739.5, dated Nov. 28, 2018, 6 pages.
Office action issued in corresponding Chinese Application No. 201710562739.5, dated Feb. 2, 2019, 6 pages.
International Search Report issued in corresponding International Application No. PCT/CN2018/094547 with English translation, dated Sep. 27, 2018, 5 pages.
Written Opinion issued in corresponding International Application No. PCT/CN2018/094547, dated Sep. 27, 2018, 4 pages.

\* cited by examiner

METHOD AND SYSTEM FOR BINDING STORAGE DEVICE AND HOST, AND METHOD AND SYSTEM FOR VERIFYING STORAGE DEVICE AND HOST

CROSS-REFERENCE TO RELATED APPLICATIONS

The present application is a continuation of International Application No. PCT/CN2018/094547, filed on Jul. 4, 2018, which claims priority to Chinese Patent Application No. 201710562739.5, filed on Jul. 11, 2017. The entire contents of both applications are incorporated herein by reference.

TECHNICAL FIELD

The disclosure relates to the field of storage devices, and more particularly to a method and system for binding and verifying between storage devices and host.

BACKGROUND

At present, for the purpose of protecting data information security, users need to ensure that a storage device, such as a mechanical hard disk (HDD) or a solid-state disk (SSD), can only be used on one or several hosts (pre-matched hosts). Once unplugged from the pre-matched host to another host, the storage device will refuse to serve. The prior art is that the storage device extracts hardware feature code of the host, and if the feature code matches the storage device, the host continues to provide the service. Since the prior art uses one to one exact match to verify the host hardware information, when the hardware feature changes partially but the host invariant, for example, when the feature of USB device is temporarily unavailable, the storage device will refuse the service under this legitimate situation incorrectly, which makes inconvenience to the user. Moreover, due to the exact matching, the host needs to send the hardware features to the storage device for verification. This causes the Man-in-the-Middle Attack (MITM Attack) in the verification process, and results that the hardware features of the host be stolen and replay attack.

SUMMARY OF THE DISCLOSURE

The technical problem to be solved by the present invention is to provide a method and system for binding storage device and host, and method and system for verifying storage device and host. The storage device can still serve a host by means of verification when the hardware features of the host are partially changed but the host is invariant; it can be ensured that the hardware features of the host can be prevented from being stolen by malicious fake storage devices, and so replay attacks are avoided.

To solve the technical problems, the invention adopts the following technical scheme:

In accordance with a first aspect of the present disclosure, a verification method between storage devices and hosts, comprising:

Sharing system parameters in advance with the host by the storage device, wherein the host is to be bound to the storage device;

Using programmable read-only memory as the storage device, dividing the programmable read-only memory into m regions, completing the binding between each region and one corresponding host to be bound by using the pre-shared system parameters, wherein m is a positive integer;

Verifying the identity of the bound host in accordance with the pre-shared system parameters through zero-knowledge proof method by the storage device; if the verification is successful, starting the storage device and serving the bound host; if the verification is unsuccessful, terminating the starting of the storage device and refusing to serve the bound host.

In some embodiments, the pre-shared system parameters include: a finite field $F\_p$; a cyclic group G which includes q elements, where q is a prime number; a generator g of the cyclic group G; and an injective function H mapping the finite field $F\_p$ to a prime field $F\_q$, wherein $q \geq p$.

In some embodiments, completing the binding between each region and one corresponding host to be bound by using the pre-shared system parameters includes:

Receiving n hardware features of $c\_1, c\_2, c\_3, \ldots c\_n$ sent by the host to be bound when the storage device is connected to the host to be bound for the first time, number of the hardware features used at the time that a verification request is sent to the storage device by the host to be bound; and a initial setting signal; where $k \leq n$, both n and K are positive integers;

Randomly drawing k samples from the finite field $F\_p$: $a\_0, a\_1, a\_2, \ldots$ and $a\_\{k-1\}$, to form a polynomial of $f(x)=a\_0+a\_1*x+a\_2*x^2 \ldots +a\_\{k-1\}*x^{\{k-1\}}$; resolving the hardware features $c\_1, c\_2, c\_3, \ldots c\_n$ received as the elements of the finite field $F\_p$, calculating the value of $f\_i=f(c\_i)$, $i=1, 2, 3 \ldots$, and sending $f\_i$ back to the host to be bound; calculating the values of $x=H(a\_0)$ and $A=g^x$, writing A into the next programmable read-only memory region which is marked as writable, and marking the programmable read-only memory region as non-writable;

After the m programmable read-only memory regions are all marked as non-writable, completing the binding of the m hosts to be bound.

In some embodiments, verifying the identity of the bound host in accordance with the pre-shared system parameters through zero-knowledge proof method by the storage device includes: verifying whether the value of S in the bound host is equal to $a\_0$ by the zero-knowledge proof, to complete the verification of the identity of the bound host; wherein Randomly selecting, by the bound host, k hardware features that may be obtained before starting from the n hardware features, and the corresponding $f\_i$ value, marking as $(c\_i, f\_i)$, $i=1, 2, 3, \ldots, k$; calculating the value of S by the bound host, wherein, $$S = \sum_{j=0}^{k-1} f_j \prod_{\substack{i=0 \\ i \neq j}}^{k-1} \frac{c_i}{c_i - c_j}$$

In accordance with the Lagrangian interpolation formula, S is equal to $a\_0$ in the case that all $(c\_i, f\_i)$ values invariant.

In some embodiments, verifying whether the value of S in the bound host is equal to a0 by the zero-knowledge proof, to complete the verification of the identity of the bound host includes:

Randomly selecting an element r from the $F\_q$ by the bound host, calculating the value of $T=g^r$, and sending T to the storage device;

Randomly selecting an element u from the $F\_q$ by the storage device, and sending the element of u to the bound host;

After receiving u by the bound host, calculating the value of $w=r+u \times H(S)$, and sending w back to the storage device as verification information;

Checking whether the equation: $g^w = T \times A^u$ is established by the storage device to verify the identity of the bound host; if the equation is established, the identity of the bound host is verified successfully, starting the storage device and serving the bound host; if the equation is not established, terminating the starting of the storage device and refusing serving the bound host.

In accordance with a second aspect of the present disclosure, a binding method between storage devices and hosts, comprising:

Sharing system parameters in advance with the host by the storage device, wherein the host is to be bound to the storage device;

Using programmable read-only memory as the storage device, dividing the programmable read-only memory into m regions, completing the binding between each region and one corresponding host to be bound by using the pre-shared system parameters, wherein m is a positive integer.

In accordance with a third aspect of the present disclosure, a verification system between storage devices and hosts, wherein the system comprises a controller located at the storage device and a controller located at the host; the controller of the storage device is configured to share system parameters in advance with the controller of the host to be bound; to use programmable read-only memory, to divide the programmable read-only memory into m regions, to complete the binding between each region and one corresponding host to be bound by using the pre-shared system parameters, wherein m is positive integer; and to verify the identity of the bound host in accordance with the pre-shared system parameters through zero-knowledge proof method; if the verification is successful, starting the storage device and serving the bound host; if the verification is unsuccessful, terminating the starting of the storage device and refusing to serve the bound host.

In some embodiments, the pre-shared system parameters include: a finite field $F\_p$; a cyclic group G which includes q elements, wherein q is a prime number; a generator g of the cyclic group G; and an injective function H mapping the finite field $F\_p$ to a prime field $F\_q$, where $q \geq p$.

In some embodiments, the controller of the storage device is configured to complete the binding between each region and one corresponding host to be bound by using the pre-shared system parameters includes:

Receiving n hardware features of $c\_1, c\_2, c\_3, \ldots c\_n$ sent by the host to be bound when the storage device is connected to the host to be bound for the first time, number of the hardware features used at the time that a verification request is sent to the storage device by the host to be bound; and a initial setting signal; where $k \leq n$, both n and K are positive integers;

Randomly drawing k samples from the finite field $F\_p$: $a\_0, a\_1, a\_2, \ldots$ and $a\_\{k-1\}$, to form a polynomial of $f(x)=a\_0+a\_1*x+a\_2*x^2 \ldots +a\_\{k-1\}*x^{\{k-1\}}$; resolving the hardware features $c\_1, c\_2, c\_3, \ldots c\_n$ received as the elements of the finite field $F\_p$, calculating the value of $f\_i=f(c\_i)$, where $i=1, 2, 3 \ldots$, and sending $f\_i$ back to the host to be bound; calculating values of $x=H(a\_0)$ and $A=g^x$, writing A into the next programmable read-only memory region which is marked as writable, and marking the programmable read-only memory region as non-writable;

After the m programmable read-only memory regions are all marked as non-writable, completing the binding of the m hosts to be bound.

In some embodiments, the controller of the storage device is configured to verify the identity of the bound host in accordance with the pre-shared system parameters through zero-knowledge proof method includes: verifying whether the value of S in the bound host is equal to $a\_0$ by the zero-knowledge proof, to complete the verification of the identity of the bound host; wherein Randomly selecting, by the controller of the bound host, k hardware features that may be obtained before starting from the n hardware features, and the corresponding $f\_i$ value, marking as $(c\_i, f\_i)$, where $i=1, 2, 3, \ldots k$; calculating the value of S by the bound host, wherein, $$S = \sum_{j=0}^{k-1} f_j \prod_{\substack{i=0 \\ i \neq j}}^{k-1} \frac{c_i}{c_i - c_j}$$

In accordance with the Lagrangian interpolation formula, S is equal to $a\_0$ in the case that all $(c\_i, f\_i)$ values invariant.

In some embodiments, verifying whether the value of S in the bound host is equal to $a\_0$ by the zero-knowledge proof, to complete the verification of the identity of the bound host includes: randomly selecting an element r from the $F\_q$ by the controller of the bound host, calculating the value of $T=g^r$, and sending T to the controller of the storage device; randomly selecting an element u from the $F\_q$ by the controller of the storage device, and sending the element of u to the controller of the bound host; after receiving u by the controller of the bound host, calculating the value of $w=r+u \times H(S)$, and sending w back to the controller of the storage device as verification information; checking whether the equation: $g^w = T \times A^u$ is established by the controller of the storage device to verify the identity of the bound host; if the equation is established, the identity of the bound host is verified successfully, starting the storage device and serving the bound host; if the equation is not established, terminating the starting of the storage device and refusing serving the bound host.

In accordance with a fourth aspect of the present disclosure, a binding system between storage devices and hosts, wherein the system comprises a controller located at the storage device;

The controller of the storage device is configured to share system parameters in advance with the controller of the host to be bound; to use programmable read-only memory, to divide the programmable read-only memory into m regions, to complete the binding between each region and one corresponding host to be bound by using the pre-shared system parameters, wherein m is positive integer.

Further, in the embodiment of the present invention. By means of binding with a host by sharing system parameters and using programmable read-only memory, and verifying the identity of the bound host by using zero-knowledge proof method according to the pre-shared system parameters, the storage device can still serve a host by means of verifying when the hardware features of the host are partially changed but the host is invariant; it can be ensured that the hardware features of the host can be prevented from being stolen by malicious fake storage devices, and so replay attacks are avoided and a storage device binding with multiple hosts can be realized.

BRIEF DESCRIPTION OF THE DRAWINGS

In order to more clearly illustrate the embodiments of the present application or the technical solutions in the prior art, the drawings to be used in the embodiments or the prior art description will be briefly described below. It is apparent that the drawings in the following description are only some of the embodiments described in the present application, and those skilled in the art can obtain other drawings based on these drawings without any creative work.

DETAILED DESCRIPTION

In order to enable those skilled in the art to better understand solutions of the present disclosure, technical solutions in embodiments of the present disclosure will be described clearly and completely hereinafter with reference to the accompanying drawings in the embodiments of the present disclosure. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

Figure 1:
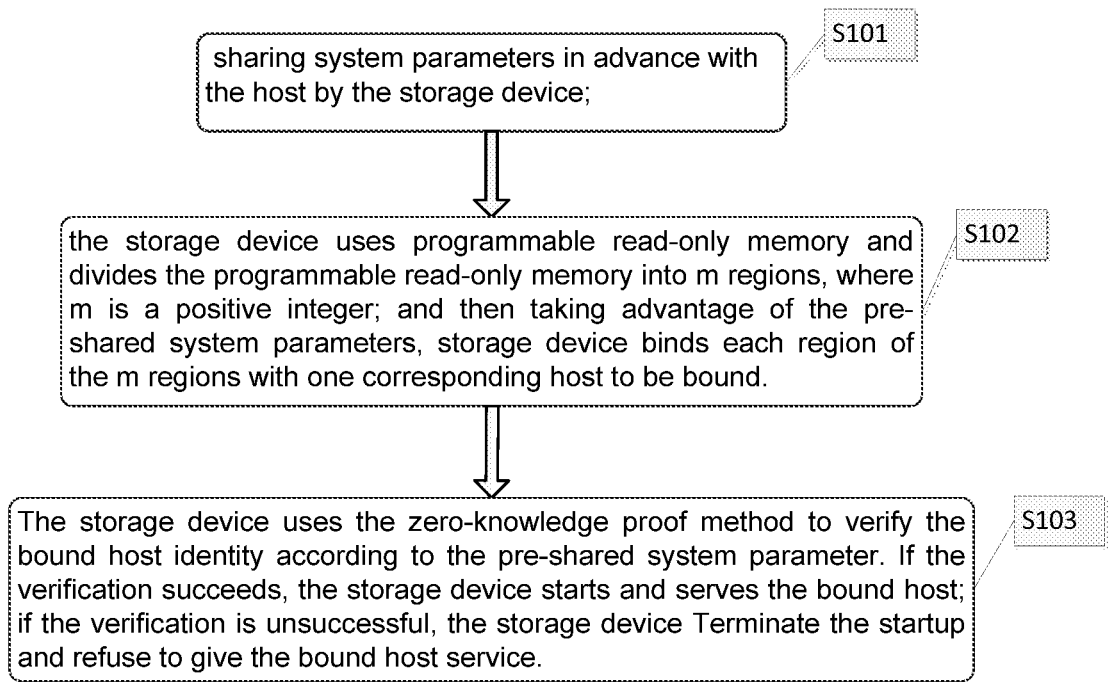
FIG. 1 is a flowchart of a method for verifying the storage device and the host according to some embodiments in the present application.

A verification method between the storage device and the host of the present invention will be further described in detail below. Please refer to FIG. 1, which is a flowchart for a method of verifying the storage device and the host according to an embodiment of the present invention. In some embodiments, The verification method between the storage device and the host includes steps S101 to S103, and the specific contents are as follows:

Step S101: sharing system parameters in advance with the host by the storage device;

In some embodiments, the pre-shared system parameters include: a finite field $F\_p$; a cyclic group G which includes q elements, where q is a prime number; a generator g of cyclic group G and it can be sampled from G randomly; and a single mapping function $H(\cdot)$ which mapping finite field $F\_p$ to prime field $F\_q$, wherein $q \geq p$.

The finite field $F\_p$, which can be a prime field and the p is a prime number, is large enough that contains all integers from 0 to p−1, and both the multiplication and addition are modulo p operations. The G can be a multiplicative subset of q reversible elements of a prime field, where q is the number of the reversible elements. And the $H:F\_p \rightarrow F\_q$ can be selected as $H(x):=x \mod q$.

Step S102: storage device uses programmable read-only memory and divides the programmable read-only memory into m regions, where m is a positive integer; The storage device uses the programmable read-only memory (PROM), such as an e-fuse array, and divides the programmable read-only memory into m regions, each region corresponding to one host to be bound.

In some preferred implementations, taking advantage of the pre-shared system parameters, storage device binds each region of the m regions with a corresponding host to be bound includes the steps from A1 to A3, and the executive agent of the steps A1 to A3 is the storage device; the specific content is as follows:

Steps A1: storage device receives n hardware features of c_1, c_2, c_3, . . . C_n, which sent by the bound host when it connects to the bound host for the first time, and the number of hardware features K, which expected to be used by the host to be bound when making verification requests to the storage device, as well as the initial setting signal; where k<n, and n and K are both positive integers. For example, as an application has UEFI (Unified Extensible Firmware Interface), the host may include the hardware features of CPU ID, network device MAC address, motherboard feature, and so on.

Steps A2: K samples, such as a_0, a_1, a_2, . . . and a_{k−1}, which selected from the finite field F_p randomly by storage device, constitute a polynomial of $f(x)=a\_0+a\_1*x+a\_2*x2 \ldots +a\_\{k-1\}*x\{k-1\}$; the received hardware features of c_1, c_2, c_3, . . . C_n are resolved as the elements of the finite field F_p; calculate the polynomial of f_i=f (c_i), i=1, 2, 3 . . . , and then send the value of f_i to the host to be bound; calculates the polynomial of x:=H(a_0) and A:=g^x, write the value of A into the next programmable read-only memory region which marked as writable, and then mark the programmable read-only memory region as non-writable. It can be implemented by fusing a fuse bit in the regions of the programmable read-only memory area and checking by a memory controller, and then the storage device can discard the values of a_0, a_1, a_2, . . . , a_{k−1} which used before. The storage device sends the values of f_i back to the host to be bound, so that the host to be bound can save them to the non-volatile memory (NVM) of the host.

Steps A3: when the m programmable read-only memory regions all have marked as non-writable, the binding with m host to be bound is completed. After the binding is completed, the storage device can only be used on the m bound hosts thereafter.

Step S103: The storage device uses the zero-knowledge proof method to verify the bound host identity according to the pre-shared system parameter. If the verification succeeds, the storage device starts and serves the bound host; if the verification is unsuccessful, the storage device terminates the startup and refuses to give the bound host service.

In some preferred implementations, the storage device verifies the identity of the bound host according to the pre-shared system parameters by using zero-knowledge proof method, including: by means of zero-knowledge proof method, verifies whether the value of S of the bound host is equal to a_0, thereby achieving the purpose of verifying the identity of the bound host;

The bound host selects k hardware features and corresponding f_i values from the n hardware features which can be acquired at startup, and then marks as (c_i, f_i) and i=1, 2, 3, . . . , k;

the bound host calculates the value of S, where:

$$S = \sum_{j=0}^{k-1} f_j \prod_{\substack{i=0 \\ i \neq j}}^{k-1} \frac{c_i}{c_i - c_j}$$

According to the Lagrangian interpolation formula, S is equal to a_0 in the case that all (c_i, f_i) values invariant.

In some preferred implementations, by means of a zero-knowledge proof method, verifies whether the value of S of the bound host is equal to a_0, thereby achieving the purpose of verifying the identity of the bound host, includes the steps from B1 to B4, and the specific content is as follows:

Steps B1: the bound host selects an element r from the F_q randomly to calculate the value of T=g^r, and then sends the value of T to the storage device;

Steps B2: the storage device selects an element u from F_q randomly and sends it to the bound host;

Steps B3: calculates the polynomial of w=r+u*H(S) after the bound host receives the element u, and returns w as verification information to the storage device;

Steps B4: the storage device verifies the identity of the bound host by checking whether the equation: g^w=T*A^u is true; if the equation is true, the identity of the bound host is verified successfully, and the storage device starts and begins to serve the bound host; on the contrary, if the equation is not true, the storage device terminates to start and refuses to sever the bound host.

The specific embodiment of the present invention uses the programmable read-only memory to establish an original trust association between the host and the storage device. And the association cannot be tampered after the establishment, so that the storage device cannot be used on other hosts and the binging between the storage device and the host are completed. Using secret sharing technology, the host can generate verification information for verifying the identity of the storage device when only providing any subset with fixed size of the hardware feature set. Completes the verification between the storage device and the host by using the zero-knowledge proof method, and makes sure that the storage device does not generate the authentication information of the host and the authentication information of the host does not be stolen by malicious disguised storage devices while verifying the identity of the host. Finally, a storage device binding with multiple hosts can be realized.

In summary, the present embodiment ensures that the host can verify the identity of the storage device when ensuring that the host has at least k hardware features of the n hardware features, which provided at initial setting by using secret sharing technology and the zero-knowledge proof method and the cryptographic algorithm. Moreover, the content of the verification information of the host will not be leaked during the verification process, and completely eradicate the middleman's attack on the verification process while ensuring usability. The embodiment can simultaneously bind the storage device to multiple hosts.

Figure 2:
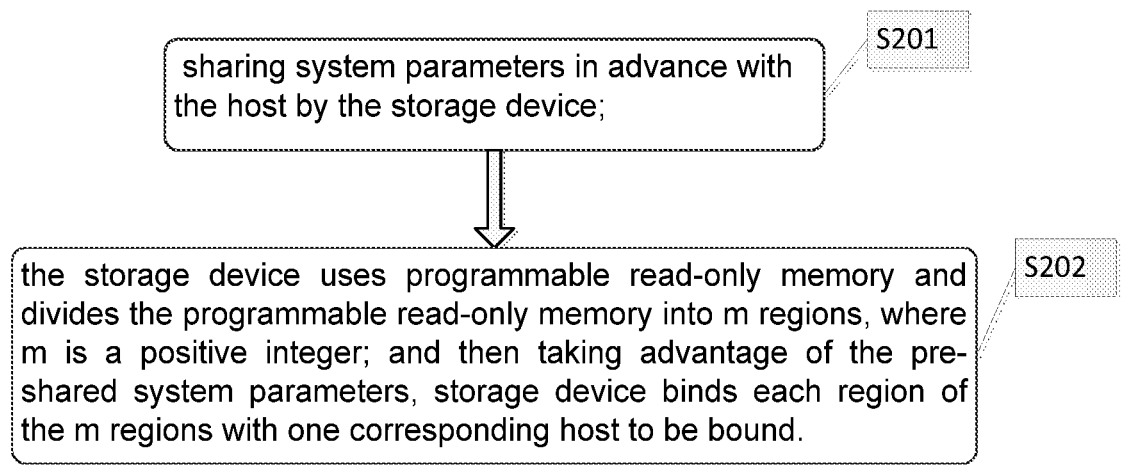
FIG. 2 is a flowchart of a method for binding the storage device and the host according to some embodiments in the present application.

A method for binding a storage device and a host of the present invention will be further described in detail below. Please refer to FIG. 2, which is a flowchart for a method of binding a storage device and a host according to some embodiments of the present invention. As shown in FIG. 2, in some embodiments, the binding method of the storage device and the host are includes steps from S201 to S202, and the specific content is as follows:

Step S201: the storage device shares the system parameters in advance with the host to be bound;

In some embodiments, the pre-shared system parameters include: a finite field F_p; a cyclic group G which includes q elements, where q is a prime number; a generator g of cyclic group G and it can be sampled from G randomly; and a single mapping function H(·) which mapping finite field F_p to prime field F_q, wherein q≥p. The finite field F_p, which can be a prime field and the p is a prime number, is large enough that contains all integers from 0 to p−1, and both the multiplication and addition are modulo p operations. The G can be a multiplicative subset of q reversible elements of a prime field, where q is the number of the reversible elements. And the H:F_p→F_q can be selected as H(x):=x mod q.

Step S202: the storage device uses programmable read-only memory and divides the programmable read-only memory into m regions, where m is a positive integer; and then taking advantage of the pre-shared system parameters, storage device binds each region of the m regions with one corresponding host to be bound.

The storage device uses the programmable read-only memory (PROM), such as an e-fuse array, and divides the programmable read-only memory into m regions, each region corresponding to one host to be bound.

In some preferred implementations, taking advantage of the pre-shared system parameters, storage device binds each region of the m regions with a corresponding host to be bound includes the steps from A1 to A3, and the executive agent of the steps A1 to A3 is the storage device; the specific content is as follows:

Steps A1: storage device receives n hardware features of c_1, c_2, c_3, ... C_n, which sent by the bound host when it connects to the bound host for the first time, and the number of hardware features K, which expected to be used by the host to be bound when making verification requests to the storage device, as well as the initial setting signal; where k<n, and n and K are both positive integers. For example, as an application has UEFI (Unified Extensible Firmware Interface), the host may include the hardware features of CPU ID, network device MAC address, motherboard feature, and so on.

Steps A2: K samples, such as a_0, a_1, a_2, ... and a_{k−1}, which selected from the finite field F_p randomly by storage device, constitute a polynomial of f(x)=a_0+ a_1*x+a_2*x2 ... +a_{k−1}*x{k−1}; the received hardware features of c_1, c_2, c_3, ... C_n are resolved as the elements of the finite field F_p; calculate the polynomial of f_i=f(c_i), I=1, 2, 3 ..., and then send the value of f_i to the host to be bound; calculates the polynomial of x:=H(a_0) and A:=g^x, write the value of A into the next programmable read-only memory region which marked as writable, and then mark the programmable read-only memory region as non-writable. It can be implemented by fusing a fuse bit in the regions of the programmable read-only memory area and checking by a memory controller, and then the storage device can discard the values of a_0, a_1, a_2, ... a_{k−1} which used before. The storage device sends the values of f_i back to the host to be bound, so that the host to be bound can save them to the non-volatile memory (NVM) of the host.

Steps A3: when the m programmable read-only memory regions all have marked as non-writable, the binding with m host to be bound is completed. After the binding is completed, the storage device can only be used on the m bound hosts thereafter.

The verification of the storage device and the host includes the procedure of binding and verification and the present invention specifically describes the binding procedure of the storage device and the host.

The specific embodiment of the present invention, establishes an original trust association between the host and the storage device by using the programmable read-only memory and the association cannot be tampered after the establishment. Therefore, ensuring that the storage device cannot be used on other hosts, and the binding between the storage device and the host is completed.

Figure 3:
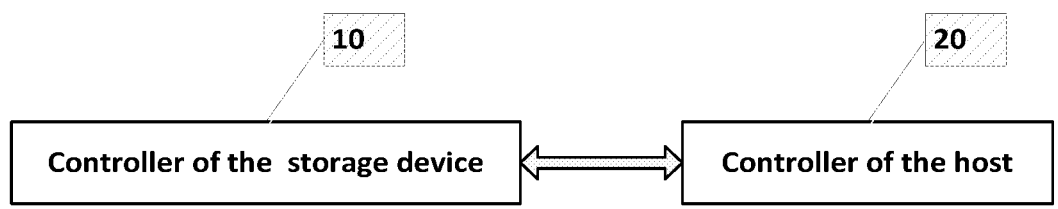
FIG. 3 is a block diagram showing the structure of the verification system for storage device and host to some embodiments in the present application.

Please refer to FIG. 3, which is a structural block diagram of a verification system between the storage device and the host provided in an embodiment of the present invention. The verification system is implemented based on an embodiment of the verification method and the description in the verification system can refer to the verification method aforementioned. As shown in FIG. 3, the verification system of the storage device and the host includes a controller 10 located at the storage device and a controller 20 located at the host.

The controller 10 of the storage device is configured to pre-share system parameters with the controller 20 of the host to be bound; the controller of the storage device is configured to pre-share system parameters with the controller of the host to be bound; uses the programmable read-only memory and divides the programmable read-only memory into m regions, wherein m is a positive integer; taking advantage of the pre-shared system parameters, storage device binds each region of the m regions with one corresponding host to be bound; storage device verifies the identity of the bound host according to the pre-shared system parameters by using zero-knowledge proof method; and if the verification is successful, the storage device starts and serves the bound host; on the contrary, if the verification is unsuccessful, the storage device terminates to start and refuses to sever the bound host.

In some embodiments, the pre-shared system parameters include: a finite field $F\_p$; a cyclic group G which includes q elements, where q is a prime number; a generator g of cyclic group G and it can be sampled from G randomly; and a single mapping function $H(\cdot)$ which mapping finite field $F\_p$ to prime field $F\_q$, wherein q≥p.

In some embodiments, taking advantage of the pre-shared system parameters, storage device binds each region of the m regions with a corresponding host to be bound includes: storage device receives n hardware features of $c\_1$, $c\_2$, $c\_3$, ... $C\_n$, which sent by the controller 20 of the bound host when it connects to the bound host for the first time, and the number of hardware features K, which expected to be used by the controller 20 of the host to be bound when making verification requests to the storage device, as well as the initial setting signal; where k≤n, and n and K are both positive integers;

K samples, such as $a\_0, a\_1, a\_2, \ldots$ and $a\_\{k-1\}$, which selected from the finite field $F\_p$ randomly by storage device, constitute a polynomial of $f(x)=a\_0+a\_1*x+a\_2*x2 \ldots +a\_\{k-1\}*x\{k-1\}$; the received hardware features of $c\_1, c\_2, c\_3, \ldots C\_n$ are resolved as the elements of the finite field $F\_p$; calculate the polynomial of $f\_i=f(c\_i)$, where $i=1, 2, 3 \ldots$, and then send the value of $f\_i$ to the host to be bound; calculates the polynomial of $x:=H(a\_0)$ and $A:=g^x$, write the value of A into the next programmable read-only memory region which marked as writable, and then mark the programmable read-only memory region as non-writable;

When the m programmable read-only memory regions all have marked as non-writable, the binding with m host to be bound is completed.

In some preferred implementations, the storage device verifies the identity of the bound host according to the pre-shared system parameters by using zero-knowledge proof method, including: by means of zero-knowledge proof method, verifies whether the value of S of the bound host is equal to $a\_0$, thereby achieving the purpose of verifying the identity of the bound host; the bound host selects k hardware features and corresponding $f\_i$ values from the n hardware features which can be acquired at startup, and then marks as $(c\_i, f\_i)$ and $i=1, 2, 3, \ldots, k$;

The bound host calculates the value of S, where:

$$S = \sum_{j=0}^{k-1} f_j \prod_{\substack{i=0 \\ i \neq j}}^{k-1} \frac{c_i}{c_i - c_j}.$$

According to the Lagrangian interpolation formula, S is equal to $a\_0$ in the case that all $(c\_i, f\_i)$ values invariant.

In some preferred implementations, by means of zero-knowledge proof method, verifies whether the value of S of the bound host is equal to $a\_0$, thereby achieving the purpose of verifying the identity of the bound host includes the steps as follows: the bound host selects an element r from the $F\_q$ randomly to calculate the value of $T=ĝ r$, and then sends the value of T to the storage device;

The storage device selects an element u from $F\_q$ randomly and sends it to the bound host;

Calculates the polynomial of $w=r+u*H(S)$ after the bound host receives the element u, and returns w as verification information to the storage device;

The controller 10 of the storage device verifies the identity of the bound host by checking whether the equation: $ĝ w=T*Â u$ is true; if the equation is true, the identity of the bound host is verified successfully, and the storage device starts and begins to serve the bound host; on the contrary, if the equation is not true, the storage device terminates to start and refuses to sever the bound host.

Figure 4:
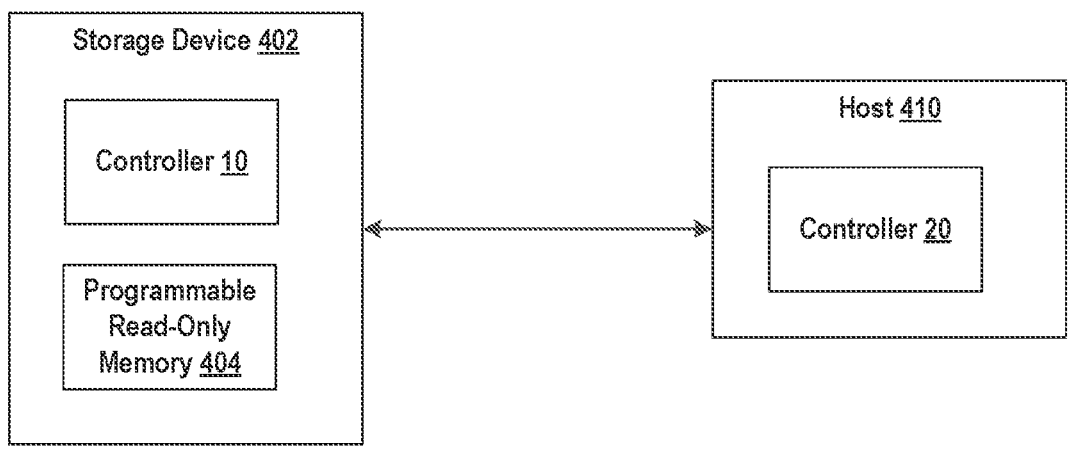
FIG. 4 is a block diagram showing a storage device and a host that interact with each other, according to some embodiments in the present application.

FIG. 4 is a block diagram showing a storage device 402 and a host 410 that interact with each other, according to some embodiments in the present application. Storage device 402 may include controller 10 of FIG. 3 and a programmable read-only memory 404. Host 410 may include controller 20 of FIG. 3.

In summary, the present embodiment provides the verification system between the storage device and the host. Moreover, by means of binding with a host by sharing system parameters and using programmable read-only memory, and verifying the identity of the bound host by using zero-knowledge proof method according to the pre-shared system parameters, the storage device can still serve a host by means of verifying when the hardware features of the host are partially changed but the host is invariant; it can be ensured that the hardware features of the host can be prevented from being stolen by malicious fake storage devices, and so replay attacks are avoided and a storage device binding with multiple hosts can be realized.

The following is an embodiment of a binding system of a storage device and a host provided in the specific embodiment of the present invention. The embodiment of the binding system is implemented based on the embodiment of the binding method. Please refer to the embodiment of the aforementioned binding method if there is contents not described in the binding system.

The embodiment of the present invention provides a binding system between the storage device and host, which includes the controller located in the storage device; the controller of the storage device is configured to pre-share system parameters with the controller of the host to be bound; uses the programmable read-only memory and divides the programmable read-only memory into m regions, where m is a positive integer.

In some preferred implementations, the pre-shared system parameters include: a finite field $F\_p$; a cyclic group G which includes q elements, where q is a prime number; a generator g of cyclic group G and it can be sampled from G randomly; and a single mapping function H(·) which mapping finite field F_p to prime field F_q, wherein q≥p.

In some preferred implementations, taking advantage of the pre-shared system parameters, storage device binds each region of the m regions with a corresponding host to be bound includes:

Storage device receives n hardware features of c_1, c_2, c_3, ... C_n, which sent by the controller 20 of the bound host when it connects to the bound host for the first time, and the number of hardware features K, which expected to be used by the controller 20 of the host to be bound when making verification requests to the storage device, as well as the initial setting signal; where k≤n, and n and K are both positive integers;

K samples, such as a_0, a_1, a_2, ... and a_{k−1}, which selected from the finite field F_p randomly by storage device, constitute a polynomial of f(x)=a_0+a_1*x+a_2*x2 ... +a_{k−1}*x{k−1}; the received hardware features of c_1, c_2, c_3, ... C_n are resolved as the elements of the finite field F_p; calculate the polynomial of f_i=f (c_i), i=1, 2, 3 ... , and then send the value of f_i to the host to be bound; calculates the polynomial of x:=H(a_0) and A:=g^x, write the value of A into the next programmable read-only memory region which marked as writable, and then mark the programmable read-only memory region as non-writable;

When the m programmable read-only memory regions all have marked as non-writable, the binding with m host to be bound is completed.

The specific embodiment of the present invention, establishes an original trust association between the host and the storage device by using the programmable read-only memory and the association cannot be tampered after the establishment. Therefore, ensuring that the storage device cannot be used on other hosts, and the binding between the storage device and the host is completed.

The above embodiments are only used to illustrate the technical solutions of the present disclosure, and are not limited thereto. Although the present invention has been described in detail with reference to the foregoing embodiments, those of ordinary skill in the art will understand. It is still possible to modify the technical solutions described in the foregoing embodiments, or to replace some of the technical features. These modifications and substitutions do not depart from the spirit and scope of the technical solutions of the embodiments of the present invention.

What is claimed is:

1. A method for verifying a storage device and a plurality of hosts, comprising: sharing a system parameter of the storage device with the plurality of hosts, wherein the storage device comprises a programmable read-only memory, the plurality of hosts are to be bound to the storage device, and the shared system parameter comprises a finite field F_p, a cyclic group G which includes q elements, where q is a prime number, a generator g of the cyclic group G, and an injective function H; dividing the programmable read-only memory of the storage device into m regions, where m is a positive integer; binding each region of the m regions of the programmable read-only memory and a corresponding host from the plurality of hosts based on the shared system parameter; verifying, by the storage device, an identity of a bound host from the plurality of hosts based on the shared system parameter using a zero-knowledge proof method; and in response to the identity of the bound host being verified, starting the storage device and serving the bound host, wherein binding each region of them regions of the programmable read-only memory and the corresponding host comprises: receiving (i) n hardware features of c_1, c_2, c_3, ... c_n sent by the corresponding host when the storage device is connected to the corresponding host for a first time, (ii) k hardware features that are used by the corresponding host when the corresponding host sends a verification request to the storage device, and (iii) an initial setting signal, where k≤n, and both n and k are positive integers; randomly drawing k samples from the finite field F_p: a_0, a_1, a_2, ... and a_{k−1}, to form a polynomial of f(x)=a_0+a_1*x+a_2*x² ... +a_{k−1}*x^{k−1}; resolving then hardware features c_1, c_2, c_3, ... c_n received as elements of the finite field F_p, calculating a value of f_i=f (c_i), where i=1, 2, 3 ... , and sending the value of f_i back to the corresponding host; calculating a value x according to x=H(a_0) and a value A according to A=g^x marking the programmable read-only memory region bound with the corresponding host as non-writable, and writing the value A into another programmable read-only memory region that is marked as writable; and after the m programmable read-only memory regions are all marked as non-writable, completing the binding of each one of the plurality of hosts.

2. The method of claim 1, further comprising in response to the identity of the bound host not being verified, terminating the starting of the storage device and refusing to serve the bound host.

3. The method of claim 2, wherein the injective function H mapping maps the finite field F_p to a prime field F_q, wherein q≥p.

4. The method of claim 1, wherein verifying the identity of the bound host includes: randomly selecting, by the bound host, k hardware features that are obtained before starting from the n hardware features, and selecting the corresponding f_i value, which is marked as (c_i, f_i), where i=1, 2, 3, ... , k; calculating a value of S by the bound host, where $$S = \sum_{j=0}^{k-1} f_j \prod_{\substack{i=0 \\ i \neq j}}^{k-1} \frac{c_i}{c_i - c_j}$$

and verifying whether the value of S in the bound host is equal to a_0 by the zero-knowledge proof method.

5. The method of claim 4, wherein verifying whether the value of S in the bound host is equal to a_0 includes:
randomly selecting an element r from the F_q by the bound host, calculating a value of T=g^r, and sending the value of T to the storage device;
randomly selecting an element u from the F_q by the storage device, and sending the element of u to the bound host;
after receiving the element of u by the bound host, calculating a value of w=r+u×H(S), and sending the value of w back to the storage device as verification information; and
determining whether an equation g^w=T×A^u is established by the storage device to verify the identity of the bound host.

6. The method of claim 5, further comprising:
in response to the equation being established, starting the storage device and serving the bound host; and
in response to the equation not being established, terminating the starting of the storage device and refusing to serve the bound host.

7. A system for verifying a storage device and a plurality of hosts, comprising a first controller of the storage device and a set of second controllers of the hosts, wherein the first controller of the storage device is configured to: share a system parameter with the second controllers of the hosts, wherein the storage device comprises a programmable read-only memory, the hosts are to be bound to the storage device, and the shared system parameter comprises a finite field $F\_p$, a cyclic group G which includes q elements, where q is a prime number, a generator g of the cyclic group G, and an injective function H; divide the programmable read-only memory of the storage device into m regions, where m is a positive integer; bind each region of the m regions of the programmable read-only memory and a corresponding host from the plurality of hosts based on the shared system parameter; verify an identity of a bound host from the plurality of hosts based on the shared system parameter using a zero-knowledge proof method; and in response to the identity of the bound host being verified, start the storage device and serve the bound host, wherein the first controller of the storage device is further configured to: receive (i) n hardware features of $c\_1, c\_2, c\_3, \ldots c\_n$ sent by the corresponding host when the storage device is connected to the corresponding host for a first time, (ii) k hardware features that are used by the corresponding host when the corresponding host sends a verification request to the storage device, and (iii) an initial setting signal, where k≤n, and both n and k are positive integers; randomly draw k samples from the finite field $F\_p$: $a\_0, a\_1, a\_2, \ldots$ and $a\_\{k-1\}$, to form a polynomial of $f(x)=a\_0+a\_1*x+a\_2*x^2 \ldots +a\_\{k-1\}*x^{\{k-1\}}$; resolve the n hardware features $c\_1, c\_2, c\_3, \ldots c\_n$ received as elements of the finite field $F\_p$, calculating a value of $f\_i=f(c\_i)$, where $i=1, 2, 3 \ldots$, and sending the value of $f\_i$ back to the corresponding host; calculate a value x according to $x=H(a\_0)$ and a value A according to $A=g^x$ marking the programmable read-only memory region bound with the corresponding host as non-writable, and writing the value A into another programmable read-only memory region that is marked as writable; and after the m programmable read-only memory regions are all marked as non-writable, completing the binding of each one of the plurality of hosts.

8. The system of claim 7, wherein the first controller of the storage device is further configured to in response to the identity of the bound host not being verified, terminate the starting of the storage device and refuse to serve the bound host.

9. The system of claim 7, wherein the injective function H mapping maps the finite field $F\_p$ to a prime field $F\_q$, wherein q≥p.

10. The system of claim 7, wherein the first controller of the storage device is further configured to: randomly select, by the bound host, k hardware features that are obtained before starting from the n hardware features, and select the corresponding f_i value, which is marked as $(c\_i, f\_i)$, where $i=1, 2, 3, \ldots, k$; calculate a value of S by the bound host, where $$S = \sum_{j=0}^{k-1} f_j \prod_{\substack{i=0 \\ i \neq j}}^{k-1} \frac{c_i}{c_i - c_j}$$

and verify whether the value of S in the bound host is equal to $a\_0$ by the zero-knowledge proof method.

11. The system of claim 10, wherein the first controller of the storage device is further configured to:
randomly select an element r from the $F\_q$ by the bound host, calculate a value of $T=g^r$, and send the value of T to the storage device;
randomly select an element u from the $F\_q$ by the storage device, and send the element of u to the bound host;
after receiving the element of u by the bound host, calculate a value of $w=r+u\times H(S)$, and send the value of w back to the storage device as verification information; and
determine whether an equation $g^w=T\times A^u$ is established by the storage device to verity, the identity of the bound host.

12. The system of claim 11, wherein the first controller of the storage device is further configured to:
in response to the equation being established, start the storage device and serving the bound host; and
in response to the equation not being established, terminate the starting of the storage device and refuse serving the bound host.

\* \* \* \* \*